United States Patent
Hauf et al.

(10) Patent No.: US 6,369,363 B2
(45) Date of Patent: Apr. 9, 2002

(54) METHOD OF MEASURING ELECTROMAGNETIC RADIATION

(75) Inventors: Markus Hauf, Ichenhausen; Thomas Knarr, Langenau; Heinrich Walk, Allmendingen; Horst Balthasar, Neu-Ulm; Uwe Müller, Eibensbach, all of (DE)

(73) Assignee: Steag Ast (DE)

( * ) Notice: Subject to any disclaimer, the term of this patent is extended or adjusted under 35 U.S.C. 154(b) by 0 days.

(21) Appl. No.: 09/789,942

(22) Filed: Feb. 16, 2001

Related U.S. Application Data

(63) Continuation of application No. 09/208,955, filed on Dec. 8, 1998, now Pat. No. 6,191,392.

(30) Foreign Application Priority Data

Dec. 8, 1997 (DE) .......................... 197 54 386
Dec. 2, 1998 (DE) .......................... 198 55 683
Dec. 12, 1998 (DE) .......................... 198 52 320

(51) Int. Cl.⁷ .............................................. F27D 11/00
(52) U.S. Cl. ................ 219/411; 219/390; 219/552; 392/416; 392/418; 374/9; 374/126; 250/492.2
(58) Field of Search ................ 219/390, 411, 219/413, 494, 502, 552, 553; 392/416, 418; 374/9, 126, 45, 128, 129; 250/492.2, 495.1; 438/795, 799

(56) References Cited

U.S. PATENT DOCUMENTS

| 4,680,451 | A | * | 7/1987 | Gat et al. ............ 219/411 |
| 5,180,226 | A | * | 1/1993 | Moslehi ............ 374/127 |
| 5,714,392 | A | * | 2/1998 | Dawson et al. ............ 437/8 |

* cited by examiner

*Primary Examiner*—Teresa Walberg
*Assistant Examiner*—Shawntina T. Fuqua
(74) *Attorney, Agent, or Firm*—R.W. Becker & Associates; R. W. Becker

(57) ABSTRACT

A method is provide for measuring electromagnetic radiation radiated from a surface of an object that is irradiated by electromagnetic radiation given off by at least one radiation source. The radiation given off by the radiation source is determined by at least one first detector, and the radiation given off by the irradiated object is determined by at least one second detector that measures the radiation. The radiation from the at least one radiation source is actively modulated with at least one characteristic pyrometer. The radiation determined by the second detector is corrected with the radiation determined by the first detector to compensate for the radiation of the radiation source reflected from the object.

5 Claims, 3 Drawing Sheets

METHOD OF MEASURING ELECTROMAGNETIC RADIATION

RELATED APPLICATIONS

This is a continuation application of U.S. patent application Ser. No. 09/208,955 filed Dec. 8, 1998 now U.S. Pat. No. 6,191,392.

BACKGROUND OF THE INVENTION

The present invention relates to a method of measuring electromagnetic radiation that is radiated from a surface of an object that is irradiated by electromagnetic radiation given off by at least one radiation source, whereby the radiation given off by the radiation source is determined by at least one first detector, and the radiation given off by the irradiated object is determined by at least one second detector that measures the radiation.

A method of this type is known, for example, from U.S. Pat. No. 5,490,728 A in conjunction with the manufacture of semiconductor substrates in a reaction chamber. In this case, the electromagnetic radiation given off by the radiation source is naturally superimposed with a waviness that is undesired and occurs due to fluctuations of the line voltage or due to phase controls. Unfortunately, no influence can be had on this waviness, and can also not be intentionally selected. The waviness is therefore only suitable, if at all, to a limited extent for an intentional utilization as a characteristic of the radiation given off by the radiation source.

Reference is also made to DE-A-26 27 753, which discloses an apparatus for measuring and controlling the thickness of optically effective thin layers during build up thereof in vacuum coating units. The measurement and control is achieved by detecting the reflection or transmission characteristic of layer thicknesses between fractions of and multiples of the essentially monochromatic measurement light that is utilized, and by interruption of the coating process when a predetermined layer thickness has been achieved. The apparatus comprises a measurement light source for a focused measurement light beam, a chopper, a beam splitter that is disposed in the axis of the measurement light beam at an angle of 45°, a measurement light receiver that is connected in series with a monochromatic illuminator, as well as a differentiator for the measurement signal and an interrupter for the coating process. Furthermore, DE-A-42 24 435 discloses an optical interface for the infrared monitoring of transparent disks, whereby the light of an infrared radiation source is conducted by a beam wave guide into the interior of the interface where it is emitted for exposing the surface of the disk. The radiation reflected at the disk that is to be monitored is received by the input of another beam wave guide and is conveyed by the beam wave guide via a daylight filter to a photo detector. U.S. Pat. No. 5,270,222 furthermore discloses a method and an apparatus for a diagnosis and prognosis during the manufacture of semiconductor devices. The apparatus has a sensor for the diagnosis and prognosis that measures various optical characteristics of a semiconductor wafer. The sensor has a sensor arm and an optoelectronic control box for conducting coherent electromagnetic or optical energy in the direction of the semiconductor wafer.

It is therefore an object of the present invention to provide a method of the aforementioned general type with which the measurement of electromagnetic radiation, and the determination of the pyrometers and values drived therefrom, can be carried out in a straightforward manner and more precisely.

The stated object is inventively realized in that the radiation given off from at least one radiation source is actively modulated with at least one characteristic pyrometer, and in that the radiation determined by the second detector is corrected by the radiation determined by the first detector to compensate for the radiation of the radiation source reflected from the object. The radiation source is, preferably a heat lamp and the irradiated object is preferably a semiconductor substrate that is subjected to a thermal treatment.

Due to the intentional, active and hence known modulation of the radiation source with a characteristic pyrometer it is possible to more precisely differentiate the difference between the radiation radiated from the object itself, and necessary for the determination of the characteristics of the object, from the radiation of the radiation source reflected from the object. In this way, it is possible to determine more precisely and in real time the characteristics of the object, for example the temperature, the emissivity, the transivity, the reflectivity, or the layer thicknesses or characteristics of a material that is on the object and differs from the material of the object.

Pursuant to one particularly advantageous embodiment of the invention, the active modulation of the radiation given off by the radiation source for the characterization thereof, is used during the correction of the radiation determined by the second detector. Due to the active and hence known modulation of the radiation given off by the radiation source, the characterization and hence differentiation of this radiation from the actually to be measured radiation that is given off by the object is particularly simple, reliable and quantitatively accurate.

The radiation given off by the radiation source is preferably modulated with respect to amplitude, frequency and/or phase. Depending upon the existing conditions and requirements, the type of modulation can be selected as desired, whereby the type of modulation can be selected in particular also with respect to the simplicity and reliability of the modulation process, but also of the evaluation process and of the detection process. In this connection, amplitude modulation means the modulation of the modulation amplitude. However, the process preferably involves intensity modulation, the amplitude of which is not modulated, but rather possibly slowly varied.

In addition to the type of modulation, it is also possible to utilize every signal shape of the modulation. However, particularly advantageous, during an amplitude modulation, is the use of a signal shape having a signal pattern that is as continuous as possible. This has the advantage that also during a Fourrier transformation high frequencies essentially do not occur and therefore the number of scans per unit of time during the detection or processing of the detected signal can remain low, so even with a simple evaluation process a good and accurate measurement can be carried out.

In general, the modulation of the characteristic pyrometer can be effected with a periodic or non periodic signal. A non periodic modulation can be obtained, for example, in that the characteristic pyrometer is linked with a positive or negative increment which is generated by means of a random mechanism, via a linking operation (e.g. addition, multiplication or a linking with a look-up-table). In this connection, after a certain interval of time has elapsed the increment is respectively predetermined pursuant to a random principle. The time interval itself can in this connection be constantly determined pursuant to a predefined function or again pursuant to a random principle. The important thing with the non periodic modulation is that the pyrometer (increment and/or time interval) determined by random principles be known and be available within an evaluation device or an evaluation process for signal analysis. The pyrometers (increment and/or time interval) determined by a random principle can satisfy an arbitrarily predefined distribution function. They can, for example, be distributed uniformly, in a Gaussian fashion or pursuant to a Poisson distribution, as a result of which the respective expected values of the pyrometers are similarly predefined. The advantage of a non periodic modulation is that as a result periodic disruptive influences can be suppressed.

A further advantageous embodiment of the invention consists in that the radiation source comprises a plurality of individual radiation sources, for example a plurality of lamps, that can be combined into one or more lamp banks. Pursuant to advantageous embodiments in conjunction with radiation sources that comprise a plurality of lamps, the radiation of at least one of the lamps is modulated. Although the modulation of the radiation of one lamp can be adequate to achieve the advantages of the inventive method, the modulation of only one lamp in general delivers a practical result only by limiting the universality of the measuring process. A particularly straight forward control of the lamps with a single power switch is also provided in particular if the radiation of at least two lamps or of all lamps are modulated in the same manner. Advantageously the radiation of only one or some of the lamps is modulated in order to avoid undesired reflections.

Depending upon the applications and conditions, it is, however, also advantageous to modulate the radiation of a lamp differently, for example if the lamp radiation is to be differentiated as a function of the position of the lamps or from the respectively specific lamp relative to the radiation of other lamps or relative to other lamps.

The radiation modulation of the individual lamps or radiation sources is preferably synchronized over time for at least some of the lamps or in a fixed time correlation relative to one another, although in certain applications radiation modulations that are not synchronized over time can also be advantageous.

Pursuant to one particularly advantageous embodiment of the invention, the degree of modulation, and especially the depth of modulation, of the radiation given off by the radiation source,—possibly also varying from radiation source to radiation source—, is independent from the radiated light intensity. This so-called absolute modulation is thus independent from the basic level or DC signal with which the radiation source or lamp is controlled. This embodiment of the invention has the advantage that during the increase of the intensity of the radiation source, which if possible is to be undertaken rapidly, the complete control can be utilized and is not limited by too great of a modulation of its intensity.

In differently laid out applications, however, an embodiment of the invention is more advantageous where the degree or depth of modulation is dependent upon the radiated intensity of the radiation source. This so-called relative modulation, where, for example, the strength of the alternating current control signal depends upon or is proportional to the strength of the DC control signal of the radiation source, has the advantage that the relative degree of modulation is constant or varies only to a slight extent, as a result of which the detection of the modulation and the evaluation are more straight-forward and can be carried out with fewer expensive and complicated devices.

Pursuant to a further embodiment of the invention, the degree or depth of modulation is controlled or also actively regulated.

Pursuant to a further very advantageous embodiment of the invention, the lamp intensity and/or modulation itself is modulated with respect to pulse width. Pursuant to an alternative or additional embodiment of the invention, the radiation of the radiation source is modulated with a data processing program by using tabular values. A further very advantageous embodiment of the invention consists in that the radiation is modulated for the pulse width modulation by altering the register frequency of generators.

The lamp output is varied by modulating the pulse width. In this connection, the radiation intensity is a function of the filament temperature which however in the stationary, steady state corresponds directly with the lamp output.

The radiation of the radiation source is preferably modulated by means of a modulation of the control signal or signals for the radiation source or the lamps. As will be described in detail subsequently, the location at which the control signal is modulated within the signal generation can be selected as a function of the requirements and conditions. In this connection, it is particularly advantageous if the control signal, after generation thereof, is modulated immediately prior to being conducted to the radiation source or the lamps.

The present invention can be used with great advantage for determining the temperature, reflectivity and/or emissivity of an object, for example in conjunction with an apparatus for the thermal treatment of substrates, for example in a furnace in which the substrates are to be rapidly heated up and cooled with a prescribed temperature gradient that is as precise as possible.

Thus, pursuant to the invention the radiation given off by at least one radiation source, for example a heat lamp, and the radiation resulting from the object that is to be heated up, are determined, whereby the radiation from the object is a combination of the radiation emitted from the object and the radiation reflected at the object. As a result of the two measurements, it is possible to correct the radiation of the radiation sources reflected from the object and hence to determine the emitted radiation, in other words the thermal radiation of the object, that is normally, and also in the case of a wafer, no black-body radiator. By knowing the emissivity of this object, it is now possible to calculate back to the radiation of a black-body.

Pursuant to the present invention, the amplitudes of the modulated components, which are also designated as alternating current or alternating voltage (AC) components, are placed into a ratio relative to one another and the components are measured by the radiation detector provided for the object and by the radiation detector provided for the radiation sources. The number that results from the amplitude ratio is in a first approximation proportional to the reflectivity of the object, for example the wafer. This number is now used two times for the further evaluation. First of all, it is used in order to differentiate the radiation emitted from the object, in other words the thermal radiation of the object, from the radiation of the radiation source reflected at the object. Second of all, this number is used in order to scale back the radiation emitted by the object, in other words the thermal radiation, to the radiation of a black-body of the same temperature. By using the thereby obtained, scaled-back temperature value in the inverted Planckian formula, there then unequivocally results a temperature. Since the known amplitude condition of the modulations is thus used two times during the evaluation, this must be measured as precisely as possible in order to obtain precise values during the evaluation and the determination of the temperature. The inventive method enables a considerably more precise determination of this amplitude ratio since the modulation pyrometers for each heating state can be optimally prescribed and not only the modulation but also the evaluation thereof are considerably simplified.

Pursuant to a particularly preferred embodiment of the invention, the first detector is a radiation detector that in a simple and reliable manner measures the radiation given off by the radiation source. In this connection, the radiation given off by the radiation source is advantageously conducted to the radiation detector via optical lines or light channels. In order to ensure an accurate measurement, the radiation sources and the optical lines or light channels are disposed relative to one another in such a way that the first radiation detector generates a signal that is free of influences from filament holding mechanisms or other means that adversely affect radiation flux or the radiation temperature of the radiation source.

Pursuant to another embodiment of the invention, the first detector can be a temperature sensor, such as a thermo element, with which the lamp temperature, and hence the radiated intensity, can be determined.

Pursuant to a further embodiment of the invention, the first detector measures any desired parameter that is related to the radiation given off by the radiation source. Thus, for example, the intensity can be determined via an impedance measurement apparatus that measures the impedance (e.g. the ohmic resistance) of a lamp filament. By means of a suitable processing unit, it is possible, by knowing the nsity relationship of the radiation source, such as a heat lamp, to determine the intensity, or a parameter proportional thereto, given off thereby.

BRIEF DESCRIPTION OF THE DRAWINGS

The invention will be subsequently explained in conjunction with the example of an apparatus for heating up semiconductor wafers with reference to the drawings, which show.

DESCRIPTION OF PREFERRED EMBODIMENTS

Figure 1:
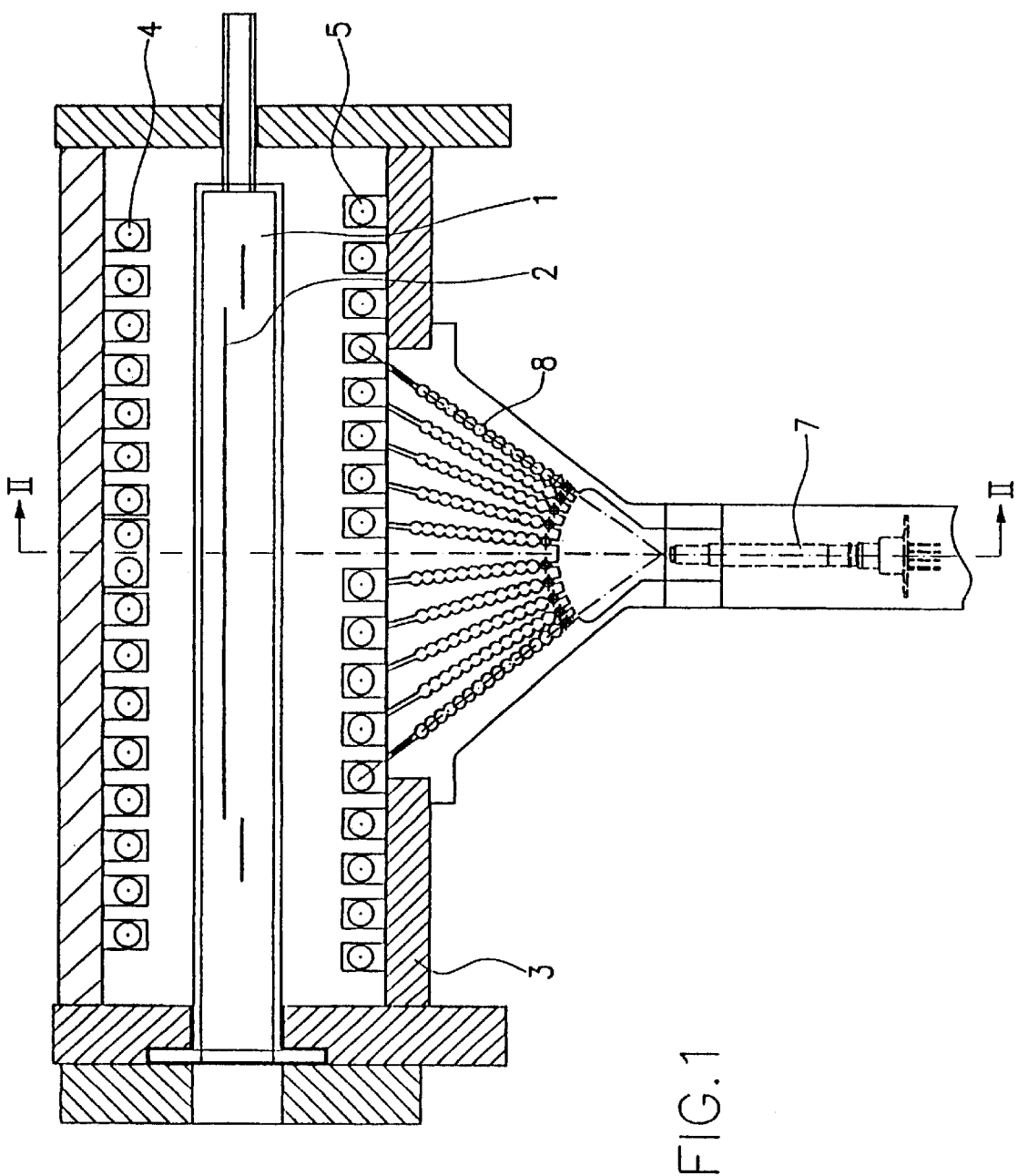
FIG. 1 a schematic longitudinal cross-sectional illustration through a rapid heating furnace for treating semiconductor wafers, FIG. 2 a cross-sectional view taken along the line II—II in FIG. 1, FIGS. 3a and 3b schematic diagrams to explain the degree or depth of modulation independently of or as a function of the base intensity of the radiation source, and FIG. 4 a schematic illustration of a block circuit diagram for controlling a radiation source or a lamp pursuant to the inventive method.
Figure 2:
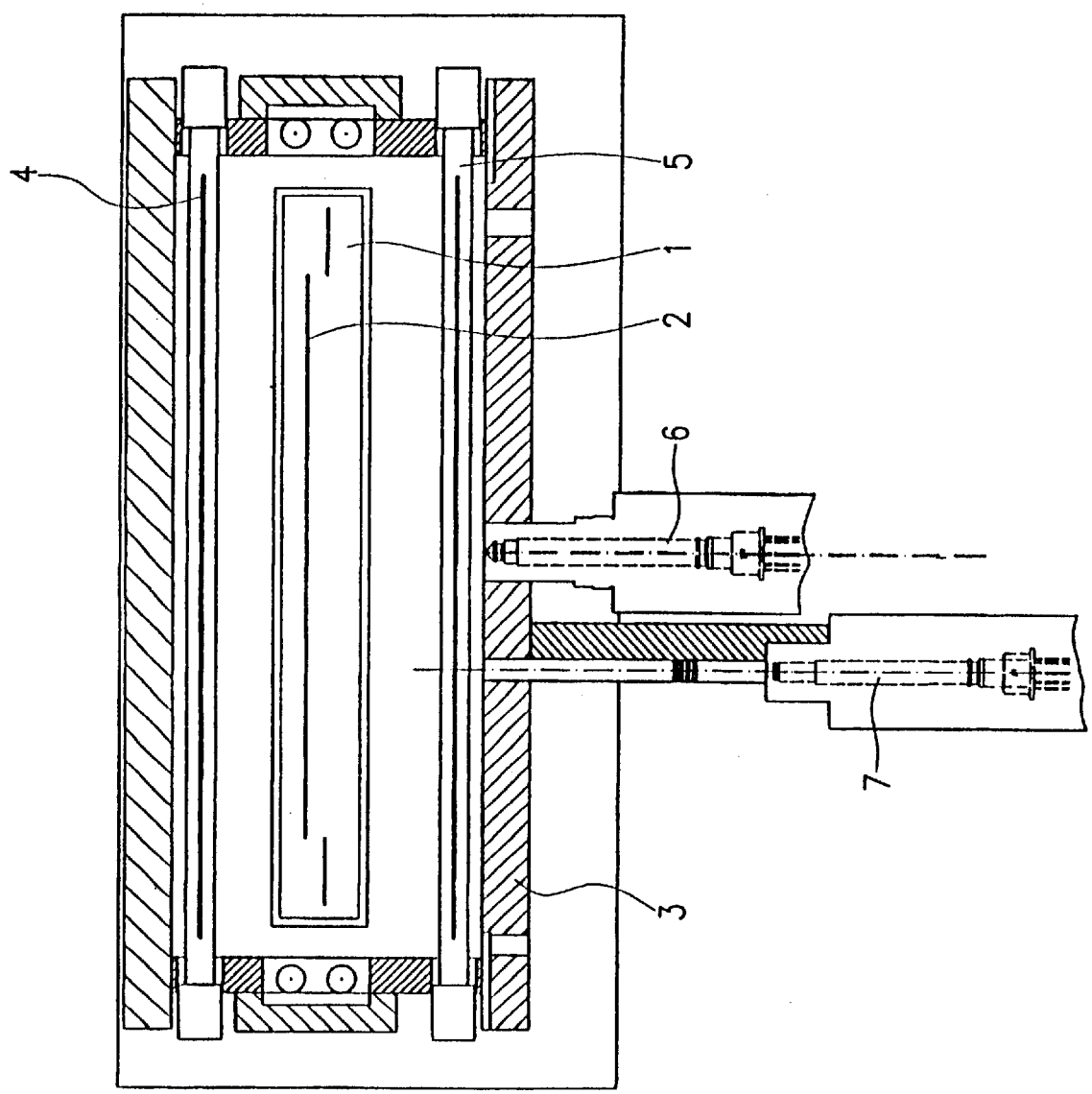

The embodiment illustrated in FIGS. 1 and 2 of a rapid heating furnace for processing semiconductor wafers 2 shows a reaction chamber 1, which is preferably comprised of quartz or silica glass, with a semiconductor wafer 2 disposed therein. The reaction chamber 1 is surrounded by a housing 3 that is respectively provided at the top and bottom with lamps 4, 5, the radiation of which is directed upon the reaction chamber 1. The reaction chamber 1 is advantageously essentially comprised of a material that is essentially transparent for the lamp radiation, and that is also transparent with respect to the measuring wavelengths or the measuring wavelength spectra of the pyrometer or the radiation detectors that are used. With quartz glasses and/or sapphire, which have an absorption coefficient, averaged over the lamp spectrum, of about $0.1\ cm^{-1}$ to $0.001\ cm^{-1}$, suitable reaction chambers for rapid heating systems can be constructed where the thickness of the reaction chamber wall can be between 1 mm and several centimeters, for example 5 cm. Depending upon the thickness of the reaction chamber wall, the selection of the material can be effected with regard to the absorption coefficient.

Chamber walls having thicknesses in the range of centimeters are then required in particular if in the reaction chamber 1 a vacuum (up to the ultra-high vacuum) or an overpressure is to be generated. If the diameter of the reaction chamber is, for example, about 300 mm, then with a quartz glass thickness of about 12 mm to 20 mm an adequate mechanical stability of the chamber 1 is achieved, so that this chamber can be evacuated. The thickness of the reaction chamber wall is designed in conformity with the material of the wall, the size of the chamber, and the pressure loads.

A schematically illustrated pyrometer 6 (see in particular FIG. 2) having a large inlet angle measures the radiation emitted from the semiconductor wafer 2 as well as the radiation of the lamps 5 reflected at the semiconductor wafer 2; in the illustrated embodiment, the lamps are embodied as rod lamps. An arrangement of this type is known and described, for example, in DE 44 37 361 C or in non-published DE 197 37 802 A of the applicant, so that in order to avoid repetition these publications are incorporated by reference to the extent relevant to the present specification.

The rod lamps are preferably halogen lamps, the filaments of which at least partially have a helical or coiled structure. By means of an at least partial helical structure, advantageously a specific predefined geometrical and spectral radiation profile of the lamp can be achieved. In this connection, the filament of the lamp can, for example, alternately include coiled and uncoiled filament sections. The radiation profile (not only the geometrical but also the spectral) is in this case essentially determined by the spacing between adjacent coiled filament sections. A further possibility for defining the lamp radiation profile consists, for example, in varying the density of the filament structure (for example the coil density) along the filament.

If the lamp profile is to be controllable, advantageously lamps, preferably rod lamps, having a number of individually controllable filaments can be used. Lamps with controllable lamp profile are particularly advantageous in rapid heating units for the thermal treatment of large-surface substrates, for example 300 mm semiconductor wafers, since with these lamps and a suitable lamp control mechanism a very homogeneous temperature profile can be achieved along the surface of the substrate. As a consequence of the superposition of the individual radiation profiles of the filaments there results an overall radiation profile of the lamp that is controllable over a wide range. In the simplest case, for example with a halogen lamp, such a lamp includes two filaments, for example each with a helical structure or an at least partially coiled structure, whereby the coil density and/or the spacing between the coiled filament sections of the first filament increases from the first end to the second end of the lamp, and the coil density and/or the spacing of the coiled element sections of the second filament correspondingly decrease in the reverse order from the first to the second end of the lamp. The overall radiation profile can thus be varied over a wide range by the selection of the current strength in the two filaments. A further possibility for embodying a lamp with controllable radiation profile consists in providing the filament of the lamp with at least three electrical connections, whereby between each two connections different operating voltages are applied. In this way, the filament temperature, and hence the radiation characteristic of a lamp, can be controlled along sections of the filament.

As an alternative to the previously described lamps, plasma or arc lamps can also be used, whereby here also the radiation profile can be controlled. Thus, for example, the lamp spectrum can be adjusted via the current density from the UV region up to the near infrared. The arc lamps, with respect to the active modulation, have the advantage that they can be operated with higher modulation frequencies. This simplifies not only the electronics for signal processing but also the analysis processes.

By means of optical lines or light channels 8, the light radiated from the lamps 5 is conveyed directly to a further pyrometer 7. In this connection, the radiation sources and/or the light channels are preferably arranged in such a way that the lamp pyrometer signal originates from a lamp or filament section that is free of filament holding mechanisms or other devices that adversely affect the radiation flux or the temperature of the filament or lamp section observed through the light channels. To avoid repetition with respect to the lamp pyrometer 7 in the arrangement for irradiating the lamp pyrometer 7 with the light of the lamps 5, reference is made to DE 197 54 385 of the same applicant and filed on the same date, which is incorporated in the present application to the extent relevant.

The output signals of the pyrometers 6 and 7 are conveyed to a non-illustrated evaluation circuit that determines the radiation emitted by the semiconductor wafer 2 by relating the radiation striking the pyrometer 6 to the radiation determined by the pyrometer 7, thereby determining the radiation that is emitted from the semiconductor wafer 2. This is possible because the radiation emitted from the lamps 5 is actively modulated in a defined manner. This modulation is also contained in the radiation taken up by the wafer pyrometer 6, so that by comparing or relating the degree of modulation or the modulation depths of the radiation taken up by the pyrometers 6 and 7, a compensation of the lamp radiation reflected from the semiconductor wafer 2 in the radiation picked up by the wafer pyrometer 6 is possible, and as a result the radiation emitted by the semiconductor wafer 2, and hence the temperature, reflectivity, transmissivity and/or emissivity thereof can be measured precisely.

A further corresponding lamp pyrometer, as this was illustrated in FIGS. 1 and 2 and previously described, can pursuant to a further embodiment also be provided with corresponding light lines or channels on the other side of the housing 3 to measure the lamp radiation of the upper lamps 4. In this connection, the function of the upper lamp pyrometer corresponds to that of the lower lamp pyrometer 7 in that the upper lamp pyrometer measures the radiation and intensity thereof relative to the upper lamps 4. In this connection, it is particularly advantageous if the type or degree of modulation of the lamps of the upper lamp bank differ from the degree or type of modulation of the lower lamp bank. By comparing the light taken up by the wafer pyrometer 6, or its type or degree of modulation, with the type or degree of the modulation of the intensity determined with the upper lamp pyrometer, in a non-illustrated analysis unit, it is furthermore possible to also determine the transmissivity of the semiconductor wafer 2, and to draw conclusions-therefrom regarding the temperature, the emissivity and/or the reflectivity of the wafer 2.

Figure 3A:
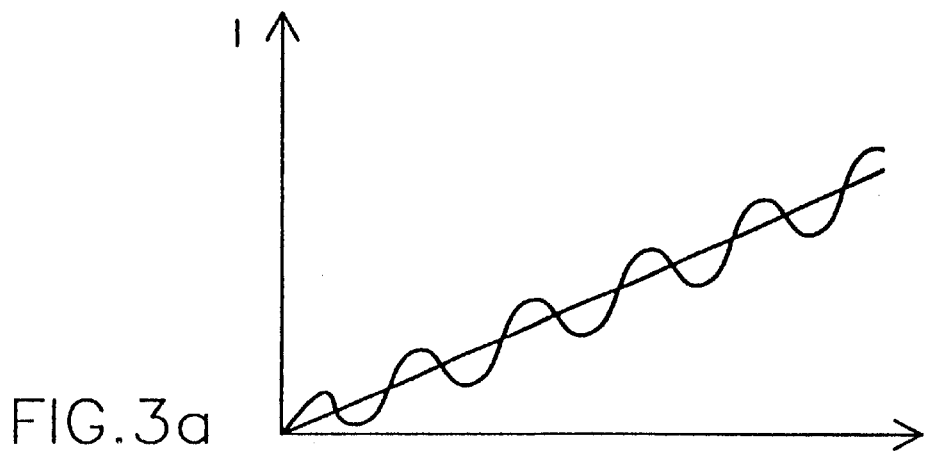
Figure 3B:
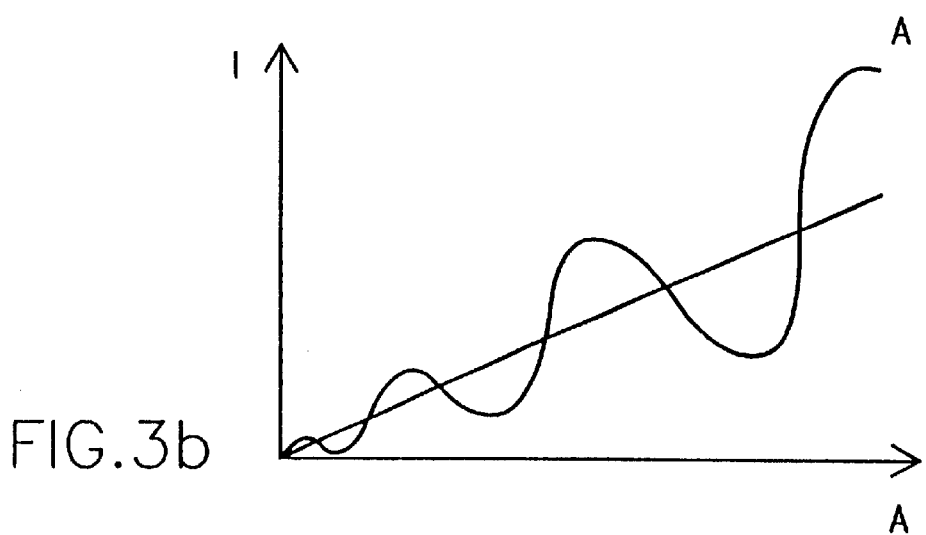

The intensities I of the radiation sources are respectively plotted versus time in FIGS. 3a and 3b. As shown in FIG. 3a, the degree or depth of modulation is essentially constant and independent of the radiation intensity given off by the radiation source, whereas in the embodiment illustrated in FIG. 3b the degree or depth of modulation depends upon the irradiated intensity of the radiation source, i.e. the magnitude of its control signal, in other words is proportional thereto.

The so-called absolute modulation of FIG. 3a has the advantage that during the heating-up of the semiconductor wafer 2 and the reaction chamber 1, the heating capacity is practically not adversely affected by the modulation, and therefore the entire intensity is available for the rapid heating. In contrast, the so-called relative modulation of FIG. 3b has the advantage of increasing the degree or depth of modulation as the radiation capacity of the radiation sources increases. It is similarly possible to control or actively regulate the modulation depth.

Figure 4:
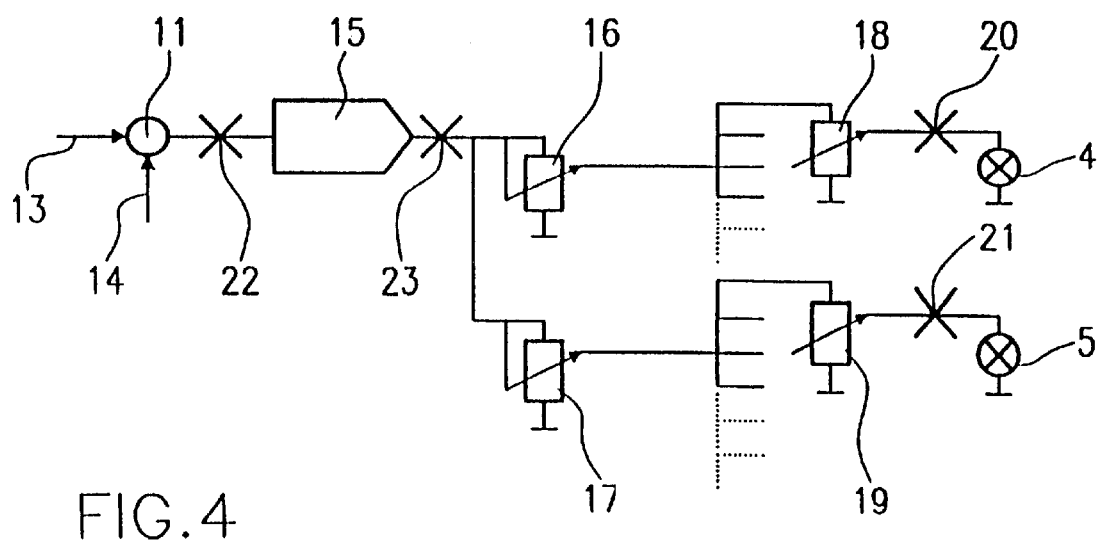

FIG. 4 illustrates a schematic circuit arrangement for the control of a radiation source or lamps 4, 5 for the generation of a radiation or a radiation gradient for a specific wafer temperature or a specific temperature gradient with which the wafer 2 is to be heated up or, by appropriate switching off or reduction of the intensity of the lamps, cooled off.

In a comparator 11 the wafer temperature (connection 13), which is indirectly measured by the wafer pyrometer 6, is respectively compared with a reference temperature 14 and the comparison signal is conveyed to a control unit 15, at the output of which the control signal, in conformity with the adjustment elements 16, 17, is distributed to the two lamps or lamp banks. Thereafter, the control signal is distributed to the individual lamps 4, 5 of the lamp banks by distributors 18, 19, whereby in order to facilitate illustration in each case merely one distributor 18, 19 is positively illustrated, such distributors providing the control signal to the lamps 4 or 5.

It is particularly advantageous if the control signal is modulated immediately before the lamps 4 or 5, since in this way distortions that are caused by the lamp control circuit can be avoided. In this case, the modulation is therefore effected at the locations 20 or 21 of the circuit by non-illustrated modulation devices, for example by programmable curve, amplitude and/or frequency gradients.

However, the modulation can also take place at other locations within the control circuit of FIG. 4, for example at the circuit location 22 or at the circuit location 23 ahead of or after the control unit 15. However, in this case an individual modulation of the control signal for a respective lamp is not possible, since the modulation of the general output signal is uniformly affected.

The modulation can be carried out by means of an appropriate data processing program in a straightforward manner. With software tables, practically all curve shapes and frequencies can be freely programmed, whereby the length of the table determines the frequency, since the table can be processed with a fixed time base (for example 1 ms), and after reaching the end of the table can be repeated as often as desired. The table can be set, for example, with a base of $2^8=256$, whereby the algorithm for the modulation is, for example:

$$c_{mod} = c_{DC} \cdot \frac{T(n)}{2^{Basis}}$$

Whereby $C_{mod}$ is the degree of modulation, $C_{DC}$ is the value of the non-modulated or base intensity or amplitude, and T(n) are the respective discrete table values.

In this way, any desired degree of modulation or modulation depths, curve shapes and frequencies can be programmed in a straightforward manner.

With, for example, a 100% modulation at 125 Hz the following discrete table values result 256, 435, 512, 435, 256, 76, 0, 76.

The mean value of the table values must in this connection correspond to the devisor so that the resulting integrated output remains unchanged.

At 10% modulation with 125 Hz the following table values result 256, 274, 282, 274, 256, 238, 230, 238.

The resolution, i.e. the number of table values per unit of time, is unchangeable by taking a different base.

This control or modulation process has the advantage that only shift and multiplication commands are required if the divisor is a number having the base 2.

The invention has been explained with the aid of preferred embodiments. However, embodiments and modifications are possible for one skilled in the art without thereby abandoning the inventive concept. The inventive method is especially advantageously usable, also in conjunction with other devices or measuring methods other than the previously described one, in order with straightforward means to be able to obtain reliable and reproduceable measurement results, and from that to be able to determine the temperature, the transmissivity, the emissivity and/or the reflectivity of objects with a high degree of precision.

The inventive method can also be used with detectors other than the illustrated and described lamp pyrometer. For example, instead of the lamp pyrometer a temperature sensor, such as a thermo element, can be used in order to determine the radiation emitted from the lamps. Furthermore, it is possible to determine the radiation emitted from the lamps by means of an impedance measurement of the lamp filament followed by processing of the measured value. With the aid of an impedance-intensity relationship of the lamp, the intensity radiated from the lamp can be inferred.

The specification incorporates by reference the disclosure of German priority document DE 197 54 386.3 of Dec. 8, 1997 and DE 198 52 320.3 of Nov. 12, 1998 and DE 198 of Dec 2, 1998.

The present invention is, of course, in no way restricted to the specific disclosure of the specification and drawings, but also encompasses any modifications within the scope of the appended claims.

What is claimed is:

1. A method of measuring electromagnetic radiation that is radiated from a surface of an object disposed in a reaction chamber in order to determine properties of said object, wherein said object, for a thermal treatment thereof, is irradiated by electromagnetic radiation given off by at least one radiation source, said method including the steps of:

determining the radiation given off by the irradiated object by means of at least one radiation detector;

to effect characterization of the radiation given off by said at least one radiation source with at least one characteristic parameter, actively modulating the radiation of said at least one radiation source by modulating a control signal thereof; and correcting the radiation determined by said at least one radiation detector by taking into account the active modulation of the radiation of said at least one radiation source, the method being used to determine the properties of temperature, emissivity, transmissivity, reflectivity, layer thickness or layer characteristics of a material that is disposed on said object and differs from the material of said object itself, wherein said object is a semiconductor wafer, and wherein the transmissivity of said semiconductor wafer is determined by means of an evaluation unit, and conclusions regarding at least one of the temperature, emissivity, and reflectivity of said wafer are effected.

2. A method of measuring electromagnetic radiation that is radiated from a surface of an object disposed in a reaction chamber in order to determine properties of said object, wherein said object, for a thermal treatment thereof, is irradiated by electromagnetic radiation given off by at least one radiation source, said method including the steps of:

determining the radiation given off by the irradiated object by means of at least one radiation detector;

to effect characterization of the radiation given off by said at least one radiation source with at least one characteristic parameter, actively modulating the radiation of said at least one radiation source by modulating a control signal thereof; and correcting the radiation determined by said at least one radiation detector by taking into account the active modulation of the radiation of said at least one radiation source, the method being used to determine the properties of temperature, emissivity, transmissivity, reflectivity, layer thickness or layer characteristics of a material that is disposed on said object and differs from the material of said object itself, wherein said object is a semiconductor wafer, and wherein at least one first radiation detector measures radiation given off by said lamps, wherein at least one second radiation detector measures radiation given off by said semiconductor wafer, and wherein an evaluation unit determines the transmissivity of said wafer.

3. A method according to claim 1 or 2, wherein said irradiation for thermal treatment of said object is effected by means of a plurality of individual radiation sources that are combined into at least one group of radiation sources.

4. A method according to claim 3, wherein said individual radiation sources are disposed above said wafer.

5. A method according to claim 3, wherein said individual radiation sources are lamps that are combined into at least one bank of lamps.

* * * * *

UNITED STATES PATENT AND TRADEMARK OFFICE
CERTIFICATE OF CORRECTION

PATENT NO.    : 6,369,363 B2                                          Page 1 of 1
DATED         : April 9, 2002
INVENTOR(S)   : Hauf et al.

It is certified that error appears in the above-identified patent and that said Letters Patent is hereby corrected as shown below:

<u>Title page,</u>
Item [30], should read as follows:
-- [30]          Foreign Application Priority Data

Dec. 8, 1997 (DE) ............................... 197 54 386
      Dec. 2, 1998 (DE) ............................... 198 55 683
      Nov. 12, 1998 (DE) ............................ 198 52 320 --

Signed and Sealed this

Tenth Day of September, 2002

*Attest:*

*Attesting Officer*

JAMES E. ROGAN
*Director of the United States Patent and Trademark Office*